March 27, 1934.    H. W. HILL    1,952,373
LENS BLOCKING DEVICE
Original Filed April 10, 1924
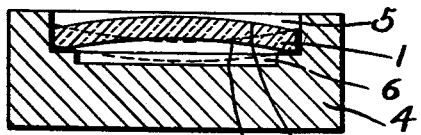
Fig. 1.
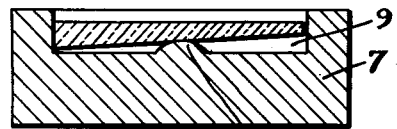
Fig. 2.
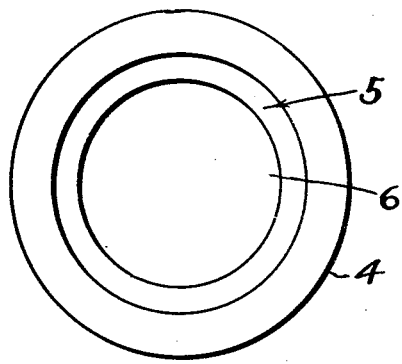
Fig. 3.
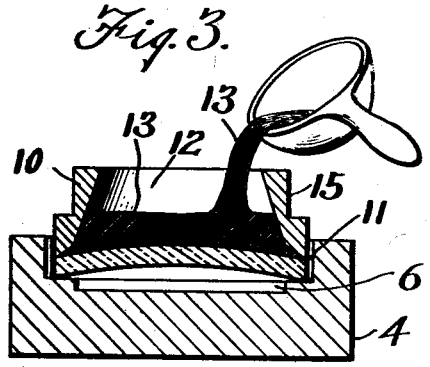
Fig. 6.
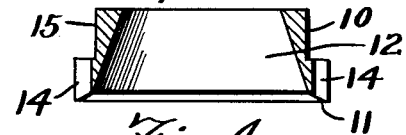
Fig. 4.
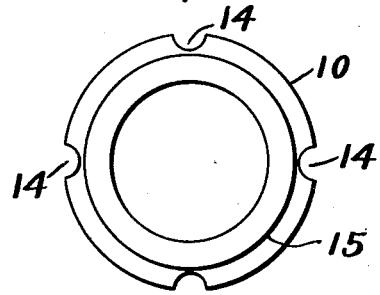
Fig. 5.
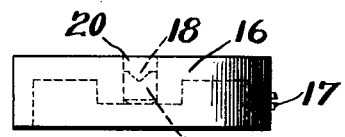
Fig. 7.
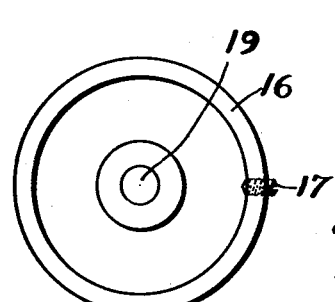
Fig. 8.
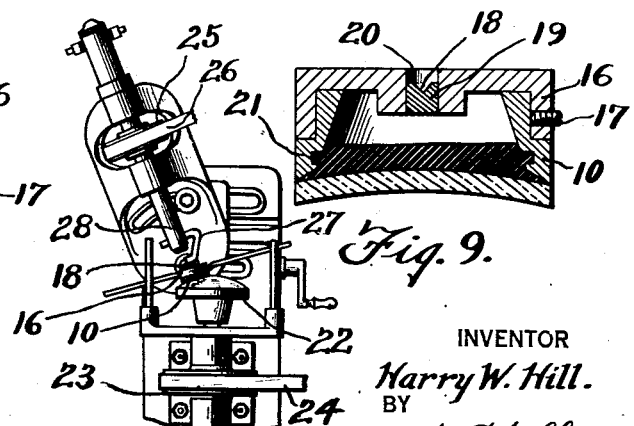
Fig. 9.
Fig. 10.
INVENTOR
Harry W. Hill.
BY
Harry H. Styll
ATTORNEY Patented Mar. 27, 1934

1,952,373

UNITED STATES PATENT OFFICE 1,952,373

LENS BLOCKING DEVICE

Harry W. Hill, Southbridge, Mass., assignor to American Optical Company, Southbridge, Mass., a voluntary association of Massachusetts Application April 10, 1924, Serial No. 705,611
Renewed February 10, 1933

6 Claims. (Cl. 51—216)

This invention relates to improved apparatus for holding precision lenses for grinding, and a process for automatically centering and holding such lenses during the various operations of precision lens grinding.

The principal object of this invention is to provide means for automatically and precisely centering a lens blank from which a precision lens is to be made, and to maintain the precise center thus obtained throughout the various manufacturing operations of grinding and finishing the lens.

Another object of the invention is to provide means to secure the lens so centered in that centered position to holding means that are themselves automatically centered in the various steps of production in order to maintain in such steps the precise centering obtained at the start.

Another object of the invention is to provide attaching means for such lens holding means to adapt the holding means to various grinding and polishing operations in machines used in the manufacture of precision lenses.

Still another object of the invention is to provide means for facile gauging of the thickness of the blank at fixed distances from the center thereof during the manufacturing operations so that the blank may be ground to an exact predetermined center thickness required in precision lenses.

Another object of the invention is to provide means to automatically center prism, toric and irregular shaped lenses and to maintain that centering throughout the various manufacturing operations.

Another object of the invention is to provide local adhesive means for holding the lens blank to the holder, that will not become displaced during the grinding and polishing operations of the lens.

One of the most important objects of the invention is to provide a process for precisely grinding one side of the lens blank to finished curvature, from which the lens blank may be automatically and precisely centered for precision grinding with localized means for securing the lens blank to holding means in such precise centered position throughout the various manufacturing operations that the first precise centering is never departed from.

With the above and other objects in view the invention consists in the novel features of construction and in the processes herein set forth and described, the preferred construction and process only being set forth by way of illustration, it being understood that modifications may be made in the construction or in the process without departing from the spirit of the invention as set forth in the accompanying claims.

Referring to the drawing,
Figure 1 is a cross section of the automatic centering device;
Figure 2 is a cross section of a modified form of centering device;
Figure 3 is a top plan view of Figure 1;
Figure 4 is a cross section of a lens holding means;
Figure 5 is a top plan view of Figure 4;
Figure 6 is a cross section of the assembled centering device and lens holding means;
Figure 7 is an end view of a grinding center attachment for the lens holder;
Figure 8 is a bottom plan view of Figure 7;
Figure 9 is a cross section through the lens holder and the grinding attachment assembled;
Figure 10 is a diagrammatic view of a grinding machine showing the assembled holder and grinding attachment in place on a grinding machine.

Referring now more particularly to the drawing, in which various reference characters designate the various parts throughout, the numeral 1 indicates the lens blank to be ground. This blank is of optical glass of suitable refractive index for ophthalmic lenses, and has one face 2 ground and polished accurately to the desired lens curve for one face of the lens. The other face 3 of this blank is molded roughly to a standardized curve approximating closely the finished curve to which it is to be eventually ground. The glass blank 1 is molded to a definite fixed diameter in order that the edge thickness at the extremities of its diameter may be gauged from time to time in order to determine the finished thickness of the lens at the center, which center thickness is of the utmost importance in the finished precision lens and must be accurately ascertained and worked to in order to accomplish the final prescription power of the lens.

After the face 2 of the blank 1 has been precisely finished, as described, the blank is placed in a centering device or block 4 which has a recess 5 to receive the lens blank, and a sub-recess 6 to receive the center of the lens when the lens is convex instead of concave on the side that goes down in the centering device, as indicated in dotted lines in Figure 1.

In cases where toric lenses, cylindrical lenses, prismatic lenses, or lenses of other unequal configuration are to be centered, a slightly modified centering device 7, Figure 2, is utilized. This centering device has a central raised portion 8, preferably in the form of a portion of a sphere. It also has a recess 9 for receiving the lens blank. When the blank is placed in the centering device 7 it is clear that its central portion will rest on the raised portion 8 instead of the lens blank bearing on its outer extremities, as in the lens receiving device 4.

After the lens blank has been placed in the centering device 4, or 7, as the case may be, a ring lens holder 10, Figures 4, 5, 6 and 9, is placed upon the finished surface of the lens blank 1. The lens holder 10 is adapted to fit loosely within the centering device 4 so that it may rock to adjust itself to the curvature of the lens surface. The under side of the lens holder 10 is made in the form of a bevelled ring, as at 11. Owing to the bevelled ring it is, therefore, possible to get line contact throughout the extent of the ring with the finished surface of the lens blank in its centering device where the finished surface is plano or is spherical in contour. This ring therefore automatically centers the lens holder to proper center upon the lens blank 1 because, as is well known, a circular ring will contact throughout its length with a spherical surface or with a plano surface which is, of course, a spherical surface of infinite radius. Where the plane of the circular ring is normal to the longitudinal axis of the lens holder the said axis will be normal to a plane surface on which the ring rests and the said axis will be radial to the spherical surface on which the said ring rests; hence the lens holder when placed on the finished surface 2 of the lens will have its longitudinal axis normal to the lens surface if it is plano and radial if its is spherical, hence the finished surface 2 of the lens automatically locates the lens holder in axial grinding position on the lens. It will be noted from the drawing that the lens holder 10 is in the form of a hollow ring, having a large central tapered recess tapering from the bottom of the ring at its widest point to the top. This tapered recess 12 is designed to permit of an adhesive being introduced into the lens holding ring and into contact with the lens blank 1. This adhesive is preferably molten pitch 13, Figure 6, which is poured into the tapered hole 12 of the lens holder and allowed to cool. Prior to inserting the pitch through the lens holder onto the face of the blank 1, the face 2 of the blank is preferably treated with a coating of shellac or a relatively soft pitch, to insure the easy separation of the blank from the holder after the manufacturing operations have been finished. It also has the advantage of making the pitch flow better over the surface and gives a uniform contact between the pitch and the lens blank, and is commonly referred to as a lens coating. The lens is cemented to the block in the axially aligned position described above so that the lens will be automatically seated in centered position on the grinding tool of the grinding machine.

The edge thicknesses of the blanks may be gauged by calipers through the recesses 14, Figure 5 and Figure 4. These recesses are cut back portions through the lip of the lens holder 10. Where spherical lenses are being operated upon it is only necessary to have two of these recesses diametrically arranged. Where toric or other irregular form lenses are used four or more recesses may be utilized.

It will be apparent from Figure 2 that when the ring 11 of the lens holder 10 is placed on the lens blank, the lens blank will be balanced and will automatically center itself on the raised portion 8, in those cases, where the lens is of a toric or prismatic or unequal formation. The recesses 5, Figure 1, and 9, Figure 2, are of sufficient depth to allow not only the thickness of the lens blank to be accommodated, but also the ring of the holder 10 so as to guide it down onto the lens blank with sufficient play for operation.

The lens holder 10 has a reduced ring 15 adapted to receive another flanged ring 16, Figures 7 and 9, which is secured to the holder 10 by means of set screws 17 or other means so that it becomes solidly united to the lens holder but removable therefrom.

The object of this ring is to provide a grinding attachment for the lens holder. This grinding attachment has a countersink 18 adapted to receive the lens pin of a lens grinding machine, giving a universal connection therewith. One preferred way of making this center connection for the lens pin is to insert a hardened block 19 in the central recess 20 of the attachment 16 having the countersink recess 18 therein.

If desired in order to insure a positive locking of the pitch in the holder the tapered hole in the holder 10 may have recesses 21, Figure 9, or may be otherwise channeled, scored, or ribbed to give the proper engagement.

When the holder 10 and the ring 16 have been secured together the blank is in shape to be applied to the grinding machine, see Figure 10. The grinding pin of the grinding machine is placed in the countersink 18, the glass blank being brought in contact with the lap 22 of the grinding machine for rough grinding, fine grinding, or polishing, as may be required. In the form shown the lap 22 is revolved by a pulley 23 and belt 24, and the upper spindle by a pulley 25 and belt 26, the grinding pin of the machine being an offset crank 27 on the upper spindle 28. The grinding means shown in Figure 10 is only one of many machines that may be utilized for this purpose and is simply shown by way of illustration to illustrate the adaptation of the lens holder to grinding machines.

It will be apparent from a study of the drawing and the description that the adhesive holding the lens to the lens holder in this process is localized, it being introduced through the opening in the lens holder and being entirely different from the prior art methods wherein pitch was placed over the face of the entire holder, especially where many lenses were held upon a block. It will also be apparent that with this method of centering and securing the blank to the lens holder in centered position, that the absolute centering is maintained throughout all the grinding and finishing operations, especially where the blank may be submitted successively to several different machines or processes.

The reason for tapering the walls of the hole 12 in the holder 10 is to provide a more rigid support for the central portion of the glass blank and also to give the widest area of pitch contact with the face of the glass blank.

I claim:

1. A device of the character described for use in blocking a glass lens blank having a contact zone on one side, the contacting plane of which is normal to the axis of the blank comprising a support having a contact seat lying in a plane normal to the axis of the blank when the said blank is rested on said seat whereby the blank will rest loosely on the support with its contact seat engaging the contact zone said support having lens holder aligning means thereon concentric with the axis of the blank, a lens holder aligned with the support by said aligning portion having a tapered opening, the wider portion of which is adjacent the lens blank and the axis coincident with the axis of the blank and having a marginal annular portion the plane of which is normal to the axis of the lens blank adapted to rest on said blank, and an adhesive in the tapered opening having its base portion secured to the surface of the lens blank, its side portions secured to the lens holder and its central outer surface unsecured thereto.

2. A device of the character described for use in blocking a glass lens blank having a contact zone on one side, the contacting plane of which is normal to the axis of the blank, comprising a support having a contact seat lying in a plane normal to the axis of the blank when the said blank is rested on said seat whereby the blank will rest loosely on the support with its contact seat engaging the contact zone, a recess in said support to receive a lens holder, an annular lens holder loosely mounted in the recess and adapted to be positioned by the blank with its axis coincident with the axis of the blank and an adhesive in the annular holder having its base portion secured to the surface of the lens blank, its side portions secured to the lens holder and its central outer surface unsecured thereto.

3. A device of the character described for use in blocking a glass lens blank having a contact zone on one side, the contacting plane of which is normal to the axis of the blank comprising a support having a contact seat recessed into one surface and lying in a plane normal to the axis of the blank when the said blank is rested on said seat whereby the blank will rest loosely on the support with its contact seat engaging the contact zone said support having lens holder aligning means thereon concentric with the axis of the blank, a lens holder loosely mounted on the support adapted to be positioned by the blank and aligning portion with its axis coincident with the axis of the blank and having a tapered opening, the wider portion of which is adjacent the lens blank and an annular marginal portion, the plane of which is normal to the axis of the lens blank adapted to rest on said blank, and an adhesive in the tapered opening having its base portion secured to the surface of the lens blank, its side portions secured to the lens holder and its central outer surface unsecured thereto.

4. A device of the character described for use in blocking a lens blank having a contact zone on one side, the contacting plane of which is normal to the axis of the blank, comprising a support having a contact seat lying in a plane normal to the axis of the blank when the said blank is rested on the seat whereby the blank will rest loosely on the support with its contact seat engaging the contact zone, said support having lens holder aligning means thereon, a lens holder aligned with the support and having an opening therethrough over the lens blank and having an aligning supporting portion adapted to interengage the aligning means of the support to support the lens holder in aligned position over the lens blank to maintain the aligned position of the lens blank on the support and an adhesive in the opening having its base portion secured to the surface of the lens blank, its side portion secured to the lens holder, and its central outer surface unsecured.

5. A device of the character described for use in blocking a lens blank having a marginal contact zone on one side thereof the plane of which is normal to the axis of the blank, comprising a supporting member having a contact zone normal to the said axis when the said blank is rested on said support with the contact zones engaging each other, said support having a recess to receive the blank and a lens holder, a lens holder in the recess and over the blank and having aligning portions adapted to align the lens holder with the supported blank when the lens holder is placed in position over the blank and the support whereby the blank is related to the lens holder in true axial grinding position, and means for securing the blank to the lens holder in said related position.

6. A device of the character described for use in blocking a lens blank having a contact zone on one side, the contacting plane of which is normal to the axis of the blank, comprising a support having a contact seat lying in a plane normal to the axis of the blank when said blank is rested on said seat whereby the blank will rest loosely on the support with its contact seat engaging the contact zone, said support having an integral flange portion extending above the lens blank and forming lens holder aligning means, a lens holder in said flange portion having an opening therein over said lens blank and having a marginal supporting portion adapted to engage the flange portion and position the lens holder in aligned position with the lens blank and an adhesive in the opening having its base portion secured to the surface of the lens blank, its side portion secured to the lens holder and its central outer surface unsecured.

HARRY W. HILL.